March 20, 1956  F. C. ARMISTEAD  2,739,242
RADIATION DETECTORS

Filed May 31, 1952  2 Sheets-Sheet 1

INVENTOR.
FONTAINE C. ARMISTEAD
BY
ATTORNEY

March 20, 1956 F. C. ARMISTEAD 2,739,242
RADIATION DETECTORS
Filed May 31, 1952 2 Sheets-Sheet 2
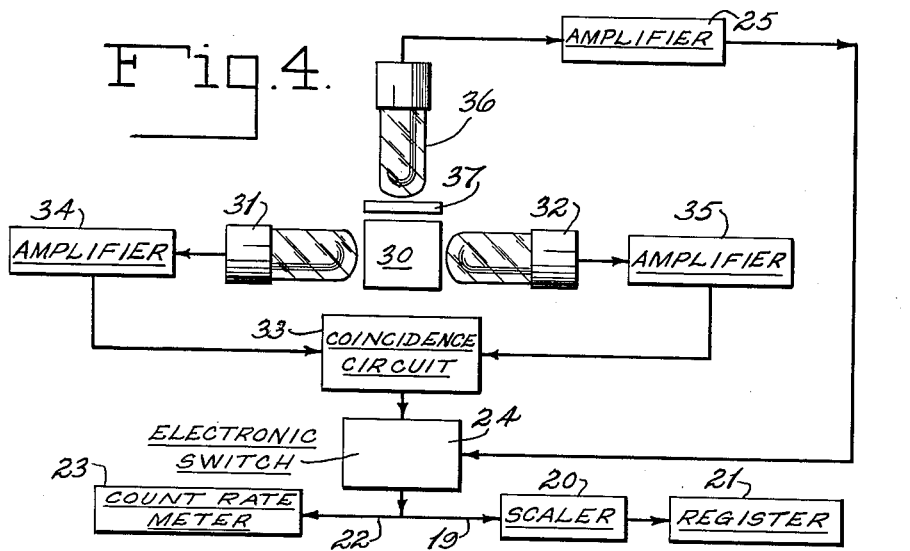
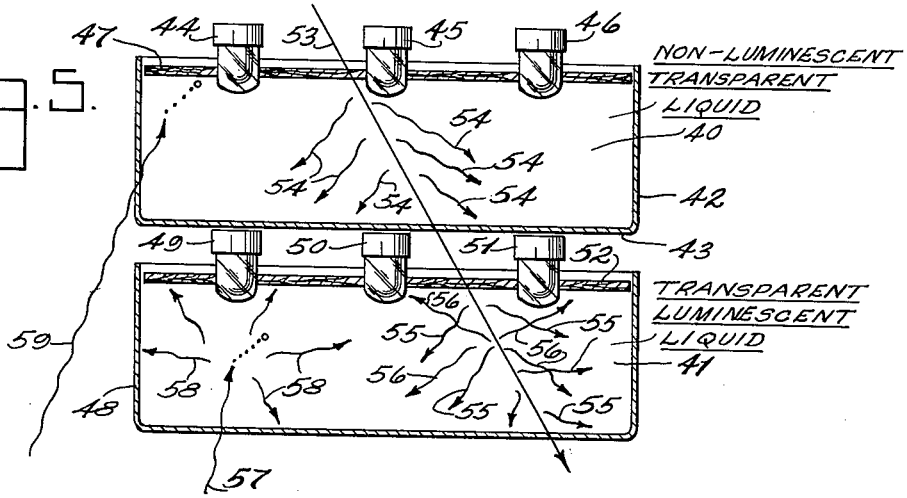
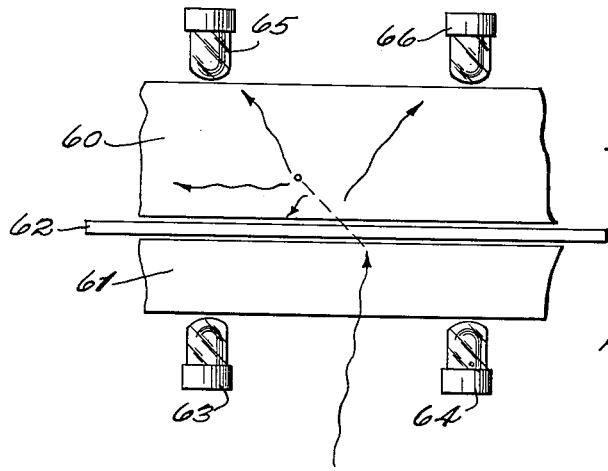
INVENTOR.
FONTAINE C. ARMISTEAD
BY
*J. H. Graham*
ATTORNEY 2,739,242
RADIATION DETECTORS

Fontaine C. Armistead, Marblehead, Mass., assignor to Texaco Development Corporation, New York, N. Y., a corporation of Delaware Application May 31, 1952, Serial No. 290,917

16 Claims. (Cl. 250—71)

This invention relates to detectors of penetrative radiation and in particular to detectors comprising means for suppressing background counts.

As is known, since penetrative radiation exists substantially everywhere, such as high in the atmosphere, on and beneath the surface of the ground, inside and outside of buildings, etc., radiation detectors will produce background counts continuously, independently of whether or not they are deliberately exposed to sources of radiation. Therefore, when a detector is used to test a known or suspected source its output actually will consist of a mixture of counts only part of which may be attributable thereto the rest being due to background radiation. If the radiation from the source has a high flux density the significance of the background counts percentagewise may be so slight that it can be disregarded. Thus there are times when the presence of background counts does not constitute a serious disadvantage, e. g., when a detector is used for testing highly radioactive materials such as ores containing radium and/or uranium.

However, there are many purposes for which it is most advantageous to be able accurately to measure radiation of very low average flux densities and to discern very slight variations therein. In such a case not only does the relatively high rate of the background counts make it more difficult to perceive small changes in output, which may occur, for example, when the detector is moved towards or away from a weak source or over the surface thereof while being maintained at a fixed distance therefrom, but, in addition, statistical variations in that high rate, which may occur due to variations in the background radiation, may entirely obliterate those changes by effectively increasing and decreasing them in a random and unpredictable manner. Accordingly it is very desirable to suppress background counts produced in detectors which are employed for certain purposes such as for radioactivity well-logging and air-borne radioactivity prospecting.

Cosmic rays comprise a portion of the background radiation which, in addition to being a rather large portion thereof, is a particularly troublesome one since: (1) cosmic rays are more effective than other kinds of radiation in actuating most types of detectors, e. g., for given numbers of cosmic and gamma rays all of which penetrate a G. M. detector the percentage of the former which are successful in actuating it is from 5 to 50 times as great as the percentage of the latter; and (2) cosmic rays are so penetrative that, unlike other components of the background, such as thermal neutrons, alpha particles, and beta particles, they are very difficult to exclude from a detector. The above-mentioned particles may all easily be stopped, say in a gamma ray detector, by shields which are so thin that even the weakest photons of the gamma radiation which it is desired to detect may readily penetrate them to reach the detector. Cosmic radiation, on the other hand, is so highly penetrative that even a shield which can hardly exclude its least penetrative components will completely exclude most photons of the less-penetrative kinds of radiation which it is commonly desired to measure, such as gamma rays, unless the latter come from a lumped source which is so small that it can be placed inside the shield with the detector.

Because of this it has been customary in the past to not attempt to shield the detector from cosmic rays, thus initially permitting them to produce counts therein, but instead to take measures electrically to eliminate these counts before they can reach the register or count rate meter. To this end at least one ancillary detector has been employed, which is heavily shielded to exclude all other types of radiation but cosmic rays, the output thereof being employed in anti-coincidence arrangements to suppress the cosmic-ray-induced counts produced in the principal detector(s). Two disadvantages of these arrangements are: (1) that they require the use of large amounts of heavy shielding materials, this being particularly objectionable in air-borne equipment, and (2) that they are not completely effectual for the purposes intended unless each cosmic ray which penetrates an unshielded principal detector also penetrates a shielded ancillary one.

One way to insure the penetration of an ancillary detector by each cosmic ray which penetrates a principal detector would be to locate the principal detector within it. However this is not permissible since the principal detector would then be completely shielded by the heavy shielding required for the ancillary detector. Accordingly it has been customary to place the principal detector above, below or on one side of the ancillary detector. In any such arrangement, and in fact even in an arrangement in which the principal detector is on all sides of the ancillary detector, it is possible for some of the cosmic rays to pass through the former without reaching the latter. Therefore these arrangements are not fully effectual to accomplish their intended function.

It is a principal object of the present invention to devise a radiation detector comprising an arrangement which is capable of suppressing cosmic ray background counts without the use of heavy shielding, thus reducing the weight of the apparatus.

It is a further object of the present invention to devise a detector as set forth in the preceding paragraph in which, due to the absence of heavy shielding, the radiation sensitive portion of the principal detector may be mounted inside that of the ancillary detector without preventing the arrival thereat of the radiation which is to be measured and so that a cosmic ray must pass through the latter sensitive portion in order to reach the former one.

It is a further object of this invention to devise a detector as set forth above, and in which in particular, due to the absence of heavy shielding, a single and common radiation sensitive portion can be used for both the principal and the ancillary detector, so that in effect, the arrangement actually comprises respective ancillary and principal detector head means, the latter being mounted within the former in the sense that it is coincident therewith, whereby there is little or no possibility of either detector being actuated by a cosmic ray without the other being simultaneously actuated thereby.

In general these objects are attained by employing a particular type of ancillary detector which is in the nature of a scintillometer (in that it comprises a means for translating penetrative radiation into light impulses and a photo-electric device for translating the light impulses into electrical impulses) in which the photo-electric device will respond solely to light impulses which are attributable to the so-called Cerenkov effect. As will be seen, only cosmic ray components have high enough velocities to induce the Cerenkov effect. Therefore this detector, i. e., the ancillary detector, is unresponsive to other types of radiation, such as gamma rays, even though it is not shielded from them.

In one embodiment the ancillary detector is made solely responsive to the Cerenkov-effect light-impulses by providing it with a special kind of means for converting penetrative radiation into light impulses, this means comprising a transparent medium which is not luminescent but has an appropriate index of refraction to induce the Cerenkov effect. To induce this effect the index of refraction must be such that the velocity of light in this medium will be less than that of particles, such as certain cosmic ray components, which are so extremely energetic as to have "relativistic" velocities, at least for a short time after first entering the medium. Since this detector head can meet this requirement without being highly absorbent of even moderately penetrative radiation, e. g., the radiation which it is desired to measure, it may be disposed to surround the detector head of the principal detector to as great an extent as the arrangement of the apparatus will permit. For example it may be a cup-shaped element into which one may insert either the luminophor of a scintillometer, which is serving as the principal detector, or the entire gas-filled envelope of a multiple-plate Geiger-Mueller tube which is so serving, or it may even entirely surround the detector head of the principal detector.

In another embodiment the photo-electric device of the ancillary detector is made solely responsive to Cerenkov-effect light-impulses by the use of a light filter, this expedient being effective since light produced through the Cerenkov effect covers a much wider spectral range than that produced by a scintillation in a luminophor. Accordingly in such an embodiment the transparent luminophor of a scintillometer-type principal detector may serve as a common light-impulse generating means for both the principal and ancillary photo-electric devices, the filter being adapted totally to reject all components of any scintillations which may originate therein but to transmit a good part of all Cerenkov-effect light except any which may exactly correspond to said components, and being, of course, positioned between the luminophor and the ancillary photo-electric device.

In the drawing:

Fig. 4 is a diagrammatic representation of another embodiment of the present invention; and Figs. 5 and 6 illustrate other detector head arrangements according to the present invention, the paths of cosmic and gamma rays and effects which they produce in the detector heads being represented to facilitate an understanding of the principles underlying the present invention.

Figure 1:
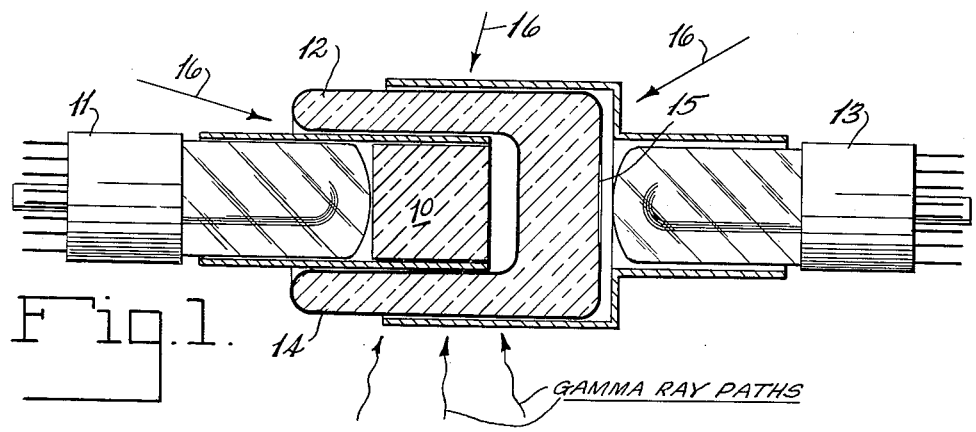
Fig. 1 represents an embodiment of the invention in which the principal detector is a scintillometer which has its luminophor located within the light-impulse producing means of the ancillary detector these elements of the arrangement being shown in longitudinal cross section.

In the Fig. 1 embodiment the principal detector is a scintillometer comprising a luminophor 10, this being its radiation sensitive or "detector head" portion, and a photo-electric device 11 such as a photo-multiplier tube. As is known this is a type of detector which has been coming into widespread use because of its generally high detection efficiency and because special types are available which are particularly suitable for detecting specific kinds of radiation, such as neutrons, alpha particles, beta particles and gamma rays with excellent efficiencies in each case. However, as in the cases of most detectors which preceded them, these detectors also inherently and unavoidably detect, and usually with even greater efficiency, any cosmic rays which impinge on their sensitive detector heads thereby generating spurious background counts. As noted above the present invention is directed to the suppression of these unwanted counts. An ancillary detector, which is employed for this purpose and is also shown in Fig. 1, may be described as being in the nature of a scintillometer. It comprises a detector head 12, which may also be referred to as a Cerenkov light-impulse source, and a photo-electric device 13.

Since the Cerenkov effect is well-known to those skilled in the art no attempt will be made herein to fully describe and explain it beyond what is necessary for a qualitative understanding of the present invention. A high energy particle will induce the Cerenkov effect whenever it penetrates a medium at a speed greater than the velocity of propagation of light in that medium. Accordingly in media having indices of refraction which are appropriate for the purposes herein, i. e., indices whose values are somewhat, but not much, greater than one (1), the Cerenkov effect will only be induced by particles which have so-called "relativistic" velocities, that is to say, velocities so close to the "terminal velocity" (the velocity of light in a vacuum) that any further slight increase would be accompanied by a tremendous increase in the electron-volt energy of the particle and a significant increase in its mass. When such a particle moves through such a medium, and until it has been slowed to the velocity of light therein, it has an effect which is analogous to that of a body which is in motion through a fluid medium at greater than the sonic velocity of propagation therein, i. e., to that of producing a "bow" or shock wave. This Cerenkov effect is accompanied and manifested by the emission of electro-magnetic wave energy whose components cover a very wide spectral region including the visible light spectrum and extending below and above it.

Cosmic rays are so extremely energetic that their energetic-particle components frequently have relativistic velocities whereas this is untrue of most other kinds of radiation with which the art of radiation detection on earth is concerned. Accordingly, if the element 12 is chosen to have an appropriate index of refraction and to not be luminescent: (1) it will produce Cerenkov impulses of light when penetrated by cosmic rays; (2) it will not produce such impulses when it is penetrated by other forms of radiation such as gamma rays; and (3) it will not produce scintillations in any event. Since it is desirable that the impulses of light generated in the source 12 all reach the photo-electric device 13 it should have good light transmission properties, i. e., translucency or transparency. Various kinds of materials are available which have the necessary good light transmission properties and appropriate indices of refraction. These include a large number of transparent plastics, clear liquids, glass, etc., such as Lucite, mineral oil, and optical glass.

Obviously if a liquid is used for the Fig. 1 embodiment then the source 12 should necessarily comprise an envelope therefor and it preferably should be hermetically sealed to permit the detector to be moved freely about without spilling the liquid. Since it is desirable to avoid the transmission of light from the luminophor 10 to the cathode of the photo-electric device 13, for example through the source 12, it will be advantageous to place an opaque shield between these two elements. In the embodiment of Fig. 1 shielding is afforded by a metallic sheath 14 which covers all of the source 12 except for a small window area 15 through which light may escape from within it to the photo-electric device 13. This metallic coating may be a very thin layer of evaporated-on aluminum, or some equivalent thereto provided the source 12 is made of some solid material such as glass, or it may be the metal part of a composite metal and glass envelope, the glass part affording the window 15, if the source 12 is a liquid. In addition to providing the shielding required between the luminophor 10 and the device 13, it will have the effect of preventing the wasteful escape of any light which may be internally radiating through the source 12 in directions away from the window 15 and of causing multiple reflections of that light so that much of it will finally pass usefully through the window to the device 13.

As shown in Fig. 1 the source 12 is represented as being cup-shaped to the end that the detector head 10 of the principal detector may be totally inserted therein. As a result of this it is impossible for a cosmic ray, such as that represented at 16, to penetrate the luminophor 10 without also penetrating some part of the source 12. This will result in an optimum rejection efficiency for this improved detector, i. e., very few if any pulses will be produced by cosmic rays in the principal detector 10, 11 without corresponding pulses being simultaneously produced in the ancillary detector 12, 13 whereby a very high percentage of rejection of these unwanted background pulses will be attained.

Since the only penetrative radiation which produces counts in a scintillometer is that which impinges on its sensitive head portion, little will be gained by making the hollow space within the source 12 deep enough to accommodate the entire detector 10, 11, that is to say, to accommodate the photo-electric device 11 as well as the luminophor 10. However, such an arrangement is within the scope of this invention as a possibly even more complete way of surrounding the detector head 10 with the source 12, and/or as a way of obtaining a double-ended embodiment, not shown, using two ancillary photo-electric devices located at opposite ends of the source 12 and employed in conjunction with a coincidence circuit for the rejection of their own thermal noise pulses.

As will be understood by those familiar with the art, where a coincidence circuit is thus employed with two ancillary photo-electric devices, the only pulses in their outputs which will be effective to suppress cosmic-ray-induced counts in the principal detector will be pairs thereof which occur simultaneously, one pulse in each device.

In such an arrangement the source 12 may comprise two halves each being cup-shaped like the source 12 in Fig. 1, and which can be connected together so that their abutting annular ends are closely enough coupled optically so that an impulse of light which originates in either one of them can be transmitted into the other through the juncture between them.

While according to the present invention the ancillary detector must always be in the nature of a scintillometer, the principal detector may be any type of detector, for example the Geiger-Mueller tubes and ionization chambers, already known in the art or any other detectors which may become known in the future, so long as it has an active head portion of such size and shape that it can have a suitable close-spaced relationship with the light-impulse source of the ancillary detector. Thus, while the ancillary detector 12, 13 shown in Fig. 2 is substantially identical to that shown in Fig. 1 the principal detector is a Geiger-Mueller tube 17 instead of a scintillometer.

Figure 2:
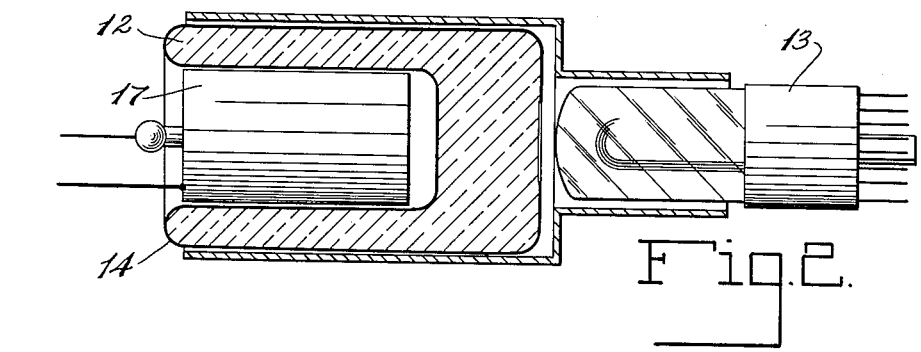
Fig. 2 is a modification of the embodiment of Fig. 1 in which the detector head of the principal detector is a Geiger-Mueller tube.
Figure 3:
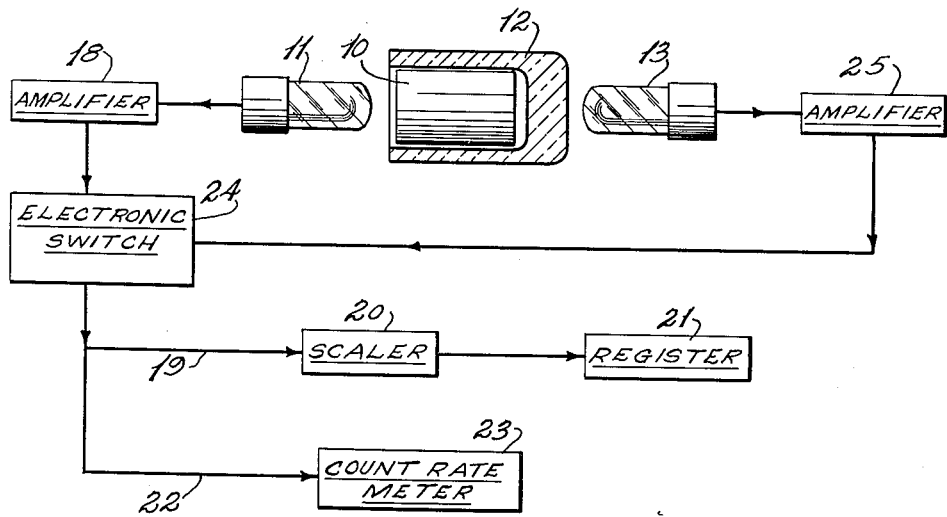
Fig. 3 is a schematic block diagram of a circuit suitable for use with the arrangement of detectors shown either in Fig. 1 or Fig. 2 for utilizing the output of the ancillary detector to suppress cosmic-ray-induced counts produced in the principal detector.

The block diagram shown in Fig. 3 is suitable for use with the detector head arrangements of both Fig. 1 and Fig. 2 except that in applying it to the latter the place occupied by the two elements 10 and 11 should be occupied by the single element 17.

It is believed that both of the circuit arrangements shown herein, i. e., that of Fig. 4 as well as that of Fig. 3 will be self explanatory to those familiar with the art. In the operation of the Fig. 3 circuit the output of the principal detector passes through an amplifier 18 en route to parallel utilization circuits which respectively comprise a device for actually counting the impulses and one for indicating the average counting rate of the detector. To this end the output of the amplifier 18 is connected, via an electronic switch 24, to a first circuit branch 19, which feeds a scaler 20 and a register 21 in series, and to a second branch circuit 22 which feeds a count rate meter 23. The component 24, while it is herein referred to as an electronic switch, might, if desired, be otherwise described as a "gating" circuit, an "anti-coincidence" circuit or a "mixer," according to widely accepted usages of these terms so long as it is remembered that it has the function of transmitting pulses over a patch in the output circuit of the principal detector (10, 11) except at times when it receives control pulses from the ancillary detector 12, 13. Thus this component may consist of, or comprise, a dual control-grid device, such as any one of a number of types of vacuum tubes which are commonly used as R. F. mixers, the device having one of its grids connected to the output of the amplifier 18 while the other is adapted to receive, from the ancillary detector, negative pulses of sufficient magnitude to cut off its output current for their respective durations. To this end an amplifier 25 is connected between the photo-electric device 13 and one of the inputs of the electronic switch 24. This amplifier should have an appropriate number of stages and sufficient gain so that the pulses which it feeds to the switch 24 will have the proper polarity and sufficient magnitude for them to be capable of switching it off.

Fig. 4 represents an embodiment of the invention in which a common detector head 30 is provided for the principal and ancillary detectors. In order that this head may perform its required function as part of the principal detector it must be a luminophor, and in particular a type of luminophor which is appropriate for detecting the specific kind of radiation which is intended to be measured, e. g., it may be of sodium iodide or an anthracene crystal. The principal detector in this embodiment utilizes two photo-electric devices 31 and 32, in a well-known type of arrangement, in which they feed a coincidence circuit 33 over respective amplifiers 34 and 35 so that the final output pulse-signals of the detector will be due almost exclusively to scintillations produced in the luminophor 30 and as little as possible to random thermal pulses originating in the photo-electric devices 31 and 32. A photo-electric device 36 for the ancillary detector is also positioned to receive light from the common detector head 30, but in order to prevent it from receiving the relatively narrow band light originating therein as scintillations, as distinguished from the relatively broad band light originating therein due to the Cerenkov effect, a light filter 37 is interposed between the head 30 and the device 36. As noted above this filter must be selected to reject all of the components of scintillations but not all of those of Cerenkov light impulses.

The Fig. 4 embodiment comprises in its circuit a number of components which correspond to components of the Fig. 3 circuit and are used to perform the same functions. Accordingly they are designated by the same reference numerals and will not be further described herein.

In the embodiment of Fig. 5 the ancillary detector head 40 does not surround the sensitive head 41 of the principal detector. Instead it is simply positioned above and extends completely over it. Such an arrangement can be quite adequate where the entire detector, as distinguished from kinds which are portable and therefore can be picked up and positioned and oriented in various ways at will, is to be carried on a vehicle, say an aircraft, for radioactivity surveying purposes, and is to have, thereon, relatively fixed orientations for its component parts. It can be quite adequate, when so used, inasmuch as cosmic radiation generally moves in downward directions toward the earth while the earth radiations which are to be measured generally move in upward directions away from the earth. Because of this a high percentage of any cosmic rays which reach the principal detector head 41 will have to first pass through the ancillary head 40 en route to it. Moreover for the measurement of radiation which is not highly penetrative this arrangement has the advantage that said radiation can reach the principal detector head without passing through any part of the ancillary one. The detector heads 40 and 41 represented in Fig. 5 consist of transparent liquids the former being non-luminescent and having an appropriate index of refraction for giving rise to Cerenkov effect light impulses from penetration by cosmic ray components, but not otherwise, and the latter being a transparent (or translucent) liquid luminophor such as terphenyl in xylene. The detector head 40 is contained within a vat 42 which may be of any suitable material except that its bottom portion 43 may preferably be made opaque as a way of preventing upwardly moving light from the head 41 from passing through the head 40 to its associated photo-electric devices. A number of photo-electric devices 44, 45 and 46 which may be of the end-window type, e. g., the R. C. A. photo-multiplier tube known as the 5819, are mounted in the ancillary detector with their end-window portions immersed in the head 40. The element represented at 47 may consist of a thin wooden board which contains a number of apertures each adapted to receive as a press-fit the end-window portion of one of the photo-electric devices 44–46 so that they will be maintained in predetermined spaced-apart relationship to one another and supported near the surface of the liquid head 40. In floating on the surface of the detector head 40 this element will serve the additional useful purpose of dampening, sloshing and splashing thereof which might tend to occur, for example as a result of vibrations of a vehicle on which the equipment is being carried. It is to be understood however that this element is in no sense an essential part of the arrangement but simply a possibly helpful single feature of one of many possible structures in which the present invention may be embodied.

Accordingly, if desired the vat 42 with its open top may be replaced by an hermetically sealed vessel which is so completely filled with the liquid that sloshing and splashing are impossible.

The head 41 of the principal detector is contained in a similar vat 48 with a number of photo-electric devices 49, 50 and 51 supported, by an element 52 which corresponds to the element 47 described above, with their end-window portions immersed in it.

When a cosmic ray passes through the Fig. 5 arrangement, for example along the path 53 shown therein, it will first penetrate the head 40 and in so doing will generate Cerenkov light rays which, as is known, have somewhat parallel directions and are therefore so represented at 54. When subsequently the same ray passes through the detector head 41 it will induce additional Cerenkov emissions, as represented at 55, and in addition luminescence as represented at 56, the latter being characterized by the fact that its rays emanate in all directions from each interaction point. If the detector heads 40 and 41 are of suitably transparent material; and if the inside surfaces of the vats 42 and 48 have good reflective surfaces, impulses of light should reach one or more of the photoelectrical devices of both the principal and ancillary detector each time that a cosmic ray penetrates both of the detector heads. As a result and in the manner explained above, an electrical impulse from the ancillary detector may be used to reject the simultaneous one that is undesirably generated in the principal detector.

When gamma rays coming upward from the earth impinge upon the detector arrangement shown in Fig. 5 somewhat different effects will result. A gamma ray which enters the detector head 41, as shown at 57, may produce a scintillation therein, as represented at 58, and in so doing give up all of its energy. In such a case the detector head 41 might be considered as accidentally acting as a shield between the source of gamma radiation and the ancillary detector head 40. However this is unnecessary since gamma rays may freely penetrate the detector head 40 without producing any light emissions whether they enter it directly, along paths such as that shown at 59, or indirectly, i. e., after having passed through the detector head 41 (doing so either because they did not sustain interactions and therefore were not retarded at all therein or because they sustained interactions of the Compton type whereby each of them in effect was replaced by another less-penetrative one).

If a gamma ray sustains an interaction in the detector head 40 its charged particle by-product(s) will not have sufficient energy to produce Cerenkov-effect light emissions, this being true for the reasons set forth above, and since the detector head 40 is not a luminophor, and therefore cannot produce scintillations, there will be no generation of light at all in this head.

The embodiment of Fig. 6 corresponds to that of Fig. 5 except that the massive light sources 60 and 61 shown in Fig. 6 are solids and therefore do not need to be contained in any vats or other receptacles. An additional difference between these two embodiments is that the ancillary detector head 61 is placed beneath the principal detector head 60 rather than above it. It may be possible to do this without lowering the efficiency of the principal detector if the head 61 does not have excessive absorption of the radiation which is to be measured. As a matter of fact doing this may increase the efficiency of the principal detector if the absorption of the ancillary detector head is chosen in accordance with the teachings of co-pending application Serial No. 244,883, filed September 4, 1951, so that it will be effective to convert radiation of the kind which is to be measured into interaction by-products which have optimum efficiencies for producing scintillations in the principal detector head.

An opaque shield 62 is shown to be interposed between the two detector heads 60 and 61 to prevent transmission of light from the former to the photo-electric devices associated with the latter. While only two photo-electric devices 63, 64 and 65, 66 are respectively shown for the ancillary and principal detectors represented in Fig. 6 yet it is to be understood that any suitable number thereof may be employed.

It is also to be understood that the outputs of groups, or "bundles," of detectors, which together respectively constitute the principal and ancillary detectors, can be connected together in a variety of possible ways in utilizing them according to the present invention. For example they may simply be multiplied together to attain maximum efficiencies in converting scintillations and light impulses into electrical pulses or they may be fed to the (two or more) inputs of coincidence circuits to suppress random noise pulses while selectively passing the useful "signal" pulses of the principal and ancillary detectors.

While one may wish completely to avoid any possibility that Cerenkov effect light will be produced by particles other than cosmic ray components by making the ancillary detector head of a material whose index of refraction does not greatly exceed one (1), it is to be understood that this is not actually essential because of the extremely short distances which such particles will be able to travel in the head. Thus in a case where a material is used which has such a large index of refraction that particles with far less than relativistic velocities can have greater speeds on entering the material than the velocity of propagation of light therein, the distances along their paths of travel in the material over which this condition will persist will be negligibly small.

Obviously many modifications and variations of the invention as hereinbefore set forth may be made without departing from the spirit and scope thereof and therefore only such limitations should be imposed as are indicated in the appended claims.

I claim:

1. Radiation detection apparatus comprising: principal detector means for converting penetrative radiation into electrical signals, said means including a radiation-sensitive portion for absorbing penetrative radiation to produce in response to a penetrative-radiation event a different type of energetic physical event; ancillary detector means for selectively responding to cosmic ray radiation to produce control signals, said last mentioned means comprising means for absorbing energy from particles having relativistic velocities to produce Cerenkov effect light emissions and a photo-electric means for converting said emissions into electrical control signals; means for transmitting said first-mentioned signals over a circuit in the output of the principal detector means; and means for applying said control signals from said photoelectric means to said signal transmitting means to prevent the transmission of said first-mentioned signals thereover during the duration of each of the control signals, said radiation sensitive portion and said means for absorbing energy from particles being in such space relationship that a large percentage of any cosmic rays which impinge on one of them will have penetrated the other en route thereto.

2. Apparatus as in claim 1 in which said radiation sensitive portion is surrounded to a considerable degree by said means for absorbing energy from particles.

3. Apparatus as in claim 1 in which said principal detector is a scintillometer, said radiation sensitive portion is the luminophor thereof, said means for absorbing energy from particles comprises a quantity of a light-transmissive material disposed to surround said luminophor to a considerable degree and the apparatus further comprises shielding means for preventing the transfer of light from said luminophor of the scintillometer to said photo-electric device of the ancillary detector means.

4. Apparatus as in claim 1 in which said sensitive portion of the principal detector is a gas filled discharge tube, and said means for absorbing energy from particles comprises a quantity of a light-transmissive material disposed to surround said discharge tube to a considerable degree.

5. Apparatus as in claim 1 in which said means for absorbing energy from particles comprises a quantity of a light-transmissive material having index of refraction greater than one.

6. Apparatus as in claim 5 in which said light transmissive material is a non-luminescent solid, the material being disposed to define a hollow space for receiving said sensitive portion of the principal detector.

7. Apparatus as in claim 1 in which the principal detector is a scintillometer, and which further comprises opaque means positioned between the luminophor of the scintillometer and said photo-electric means of the ancillary detector for preventing the transmission of light from the former to the latter.

8. Apparatus as in claim 1 in which said means for absorbing energy from particles comprises a quantity of light transmissive material surrounded by a light reflecting means having a window portion adjacent said photo-electric means, said reflecting means being adapted to prevent the escape of said Cerenkov-effect light emissions from the light transmissive material except through said window portion and thereby toward said photo-electric means.

9. Apparatus as in claim 1 in which said principal detector is a scintillometer, the luminophor of the scintillometer constituting the radiation-sensitive portion of the detector and the scintillometer including a number of photo-electric devices all optically coupled to said luminophor and electrically connected to a coincidence circuit for the suppression of output pulses originating as thermal noise pulses in the photo-electric devices of the principal detector, said means for transmitting said first-mentioned signals over a circuit in the output of the principal detector means is connected to the output of the coincidence circuit and the apparatus further comprises shielding means for preventing the transfer of light from said luminophor of the scintillometer to said photo-electric device of the ancillary detector means.

10. Apparatus as in claim 1 in which said principal detector is a scintillometer, said radiation-sensitive portion is the luminophor thereof, and said means for absorbing energy from particles comprises in combination said luminophor of the principal detector and a filter disposed between the luminophor and the photo-electric means of the ancillary detector, the filter being adapted to reject substantially all of the light components of scintillations produced in said luminophor and to pass a substantial portion of the components of the Cerenkov-effect light emissions.

11. Apparatus as in claim 1 in which said means for absorbing energy from particles comprises a quantity of a light-transmissive material and a light filter positioned between said quantity of material and the photo-electric means of the ancillary detector.

12. Apparatus as in claim 1 which is particularly suited for air-borne radioactivity surveying and in which said radiation-sensitive portion and said means for absorbing energy from particles are disposed one above the other and have substantially co-extensive areas respectively exposed to radiation which is directed generally downward toward the earth and other radiation which is directed generally upward from the earth.

13. Apparatus as in claim 12 which further comprises an opaque light shielding means positioned between said radiation sensitive portion and said means for absorbing energy from particles.

14. Apparatus as in claim 1 in which said principal detector is a scintillometer including a massive luminophor and a plurality of photo-electric devices all having their cathodes optically coupled to said luminophor; said luminophor and said means for absorbing energy from particles are disposed one above the other and have coextensive areas which are exposed to radiation which is directed generally downward toward the earth and other radiation which is directed generally upward from the earth and the apparatus further comprises shielding means for preventing the transfer of light from said luminophor of the scintillometer to said photo-electric device of the ancillary detector means.

15. Apparatus as in claim 14 in which said massive luminophor is a liquid luminophor and said plurality of photo-electric devices are at least partially immersed therein.

16. Apparatus as in claim 15 in which said means for absorbing energy comprises a quantity of light-transmissive liquid; the photo-electric means for the ancillary detector also comprises a plurality of photo-electric devices; and each of said last-mentioned devices is at least partially immersed in said last-mentioned liquid.

References Cited in the file of this patent

UNITED STATES PATENTS

| | | |
|---|---|---|
| 2,448,963 | Dicke | Sept. 7, 1948 |
| 2,535,066 | Herzog | Dec. 26, 1950 |
| 2,554,933 | Wouters | May 29, 1951 |
| 2,617,042 | Wouters | Nov. 4, 1952 |